(12) United States Patent  
Kim et al.

(10) Patent No.: US 8,958,690 B2
(45) Date of Patent: Feb. 17, 2015

(54) CAMERA MODULE

(71) Applicant: Samsung Electro-Mechanics Co., Ltd., Suwon (KR)

(72) Inventors: Ju Chul Kim, Suwon-si (KR); Ki Mun Paik, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 14/109,898

(22) Filed: Dec. 17, 2013

(65) Prior Publication Data

US 2014/0294376 A1 Oct. 2, 2014

Related U.S. Application Data

(60) Provisional application No. 61/805,249, filed on Mar. 26, 2013.

(30) Foreign Application Priority Data

May 10, 2013 (KR) .................. 10-2013-0053384

(51) Int. Cl.
G03B 17/02 (2006.01)
(52) U.S. Cl.
CPC ..................... *G03B 17/02* (2013.01)
USPC .......................................... 396/535
(58) Field of Classification Search
CPC ... G04N 5/2257; G04N 5/2254; G03B 17/02; G03B 17/00
USPC ................................. 396/535, 541
See application file for complete search history.

(56) References Cited

U.S. PATENT DOCUMENTS

| 7,983,555 | B2* | 7/2011 | Lee et al. ..................... 396/533 |
| 8,360,666 | B2* | 1/2013 | Lin ................ 396/529 |
| 2007/0116445 | A1* | 5/2007 | Kozakai et al. ................ 396/55 |
| 2009/0040360 | A1* | 2/2009 | Taniguchi ..................... 348/335 |
| 2009/0295983 | A1 | 12/2009 | Sekimoto et al. |
| 2009/0310959 | A1 | 12/2009 | Shih et al. |

(Continued)

FOREIGN PATENT DOCUMENTS

| JP | 2009-053331 | 3/2009 |
| KR | 10-2008-0048113 A | 6/2008 |
| KR | 10-2010-0115161 | 10/2010 |
| KR | 10-2011-0013680 | 2/2011 |
| KR | 10-2011-0055899 | 5/2011 |
| KR | 10-2013-0008770 A | 1/2013 |

OTHER PUBLICATIONS

Office Action dated May 20, 2014 for corresponding Korean Patent Application No. 10-2013-0053384 and its English summary provided by Applicant's foreign counsel.
Partial European Search Report dated Jul. 22, 2014 for corresponding European Patent Application No. 13275303.9.
European Search Report dated Nov. 26, 2014 for European Patent Application No. 13275303.9.

*Primary Examiner* — Rodney Fuller
(74) *Attorney, Agent, or Firm* — Ladas & Parry, LLP

(57) ABSTRACT

A camera module includes a lens barrel having at least one lens disposed in an optical axis direction, a housing having the lens barrel disposed therein, and a case coupled to the housing to cover the outer surfaces of the housing. The case may include at least one of a protrusion part protruding inwardly from an upper edge of the case, a coupling forming part protruding outwardly from the upper edge of the case, and a coupling part protruding from an outer surface of the case. The protrusion part, the coupling forming part or the coupling part may be formed integrally as one piece with the case.

40 Claims, 6 Drawing Sheets

(56) References Cited

U.S. PATENT DOCUMENTS

| | | | |
|---|---|---|---|
| 2011/0080515 A1* | 4/2011 | Kang | 348/374 |
| 2011/0236008 A1 | 9/2011 | Kang et al. | |
| 2011/0285890 A1* | 11/2011 | Choi et al. | 348/308 |
| 2011/0311214 A1* | 12/2011 | Lin et al. | 396/535 |
| 2012/0039590 A1* | 2/2012 | Jacobsen et al. | 396/133 |
| 2013/0070101 A1 | 3/2013 | An et al. | |
| 2013/0093947 A1* | 4/2013 | Lee et al. | 348/374 |
| 2013/0128108 A1* | 5/2013 | Oh et al. | 348/374 |
| 2013/0155311 A1* | 6/2013 | Grandin et al. | 348/335 |

\* cited by examiner

CAMERA MODULE

CROSS-REFERENCE TO RELATED APPLICATIONS

This application claims the benefit of Korean Patent Application No. 10-2013-0053384 filed on May 10, 2013, with the Korean Intellectual Property Office, and U.S. Provisional Application No. 61/805,249 filed on Mar. 26, 2013, with the United States Patent and Trademark Office, the disclosures of which are incorporated in their entireties herein by reference.

BACKGROUND

1. Technical Field

The present technology generally relates to a camera module.

2. Description of the Related Art

Unless otherwise indicated herein, the materials described in this section are not prior art to the claims herein and are not admitted to be prior art by inclusion in this section.

Recently, it has become common for portable communication terminals such as mobile phones, personal digital assistants (PDAs), portable computers, or the like to transmit image data in addition to text or voice data.

Portable communications terminals are commonly provided with a camera module to transmit image data, facilitate video chatting, and the like.

In accordance with the trend for miniaturization and slimness of electronic devices having camera modules mounted therein, such as the mobile phones, PDAs, or the like, the miniaturization of the camera module has become at issue. Therefore, efforts to decrease the overall size of camera modules while not decreasing the number of pixel elements thereof have been undertaken.

In addition, in order to mount miniaturized camera modules in various electronic devices, a degree of design freedom of the camera module itself needs to be secured.

SUMMARY

Some of embodiments herein provide a camera module with: a stopper member for limiting movement of a lens barrel to be formed integrally with a case thereof, and a coupling structure for coupling with an external device to be formed integrally with the case thereof. These, for example, improve a degree of design freedom for coupling to various external devices, implementing miniaturization and slimness and simplifying the manufacturing process.

According to some embodiments herein, a camera module may include a lens barrel; a housing having the lens barrel disposed therein; and a case coupled to the housing to cover outer surfaces of the housing, wherein the case includes a protrusion part protruding inwardly from an upper edge of the case and formed integrally with the case. The lens barrel may include at least one or more lenses disposed in an optical axis direction. The protrusion part of the case may be configured to limit movement of the lens barrel in the optical axis direction.

A lower surface of the protrusion part may partially contact an upper surface of the housing.

The lens barrel may include a catching part protruding from an outer surface thereof and facing the protrusion part.

The case may further include a coupling forming part protruding outwardly from the upper edge of the case.

The coupling forming part may be formed integrally with the case.

In a horizontal direction, an upper portion of the case provided with the coupling forming part may have a cross-sectional area greater than that of a lower portion of the case.

A cross-sectional area of the coupling forming part in the horizontal direction may be decreased upwardly in the optical axis direction.

The coupling forming part may be provided with a coupling part for coupling with an external device.

The coupling part may define a groove recessed upwardly in the optical axis direction from a lower surface of the coupling forming part.

The coupling part may have a shape of a hole penetrating through the coupling forming part.

The camera module may further include a cover part coupled to the case to cover an upper portion of the coupling forming part. The cover part may be coupled to the coupling forming part via an adhesive.

The coupling forming part may define an insertion groove formed in an outer edge of the upper portion thereof, and the cover part may have an insertion protrusion protruding from an outer edge thereof, the insertion protrusion being inserted into the insertion groove.

The camera module may further include a transparent window part coupled to an upper surface of the case. The transparent window part may be coupled to the case via an adhesive.

The upper surface of the case may be provided with a step part stepped downwardly in the optical axis direction, and the transparent window part may be mounted on the step part.

According to some embodiments herein, a camera module may include a lens barrel; a housing having the lens barrel disposed therein; and a case coupled to the housing to cover outer surfaces of the housing. The case may be provided with a coupling part for coupling with an external device, the coupling part protruding from an outer surface of the case, and an inner surface of the case corresponding to a portion thereof on which the coupling part is formed may be a flat surface. The lens barrel may include at least one or more lenses disposed in an optical axis direction.

The coupling part may be formed integrally with the case.

The coupling part may have a polyhedral shape.

The case may include a protrusion part protruding inwardly from an upper edge of the case.

The lens barrel may include a catching part protruding from an outer surface thereof and facing the protrusion part.

According to some embodiments herein, a camera module may comprise a lens barrel, a housing receiving the lens barrel therein, and a case covering the housing, the case having a first part protruding inwardly from an upper edge of the case and a second part protruding outwardly from the upper edge of the case. The first and second parts of the case may be formed integrally as one piece with the case.

The first part of the case may be configured to limit movement of the lens barrel in an optical axis direction. The second part of the case may be configured to couple with an external device.

The camera module may further comprise a transparent window part coupled to the case. The upper surface of the case may comprise a step part to mount the transparent window part thereon.

The lens barrel may comprise a catching part protruding from an outer surface thereof and facing the protrusion part.

A lower surface of the first part may contact an upper surface of the housing.

The second part of the case may comprise a groove or a hole.

The case may further comprise a cover part covering an upper portion of the second part of the case. The cover part may be coupled to the second part of the case via an adhesive.

BRIEF DESCRIPTION OF THE DRAWINGS

Embodiments of the present invention will be more clearly understood from the following description taken in conjunction with the accompanying drawings, in which.

DETAILED DESCRIPTION OF THE EMBODIMENTS

Figure 1:
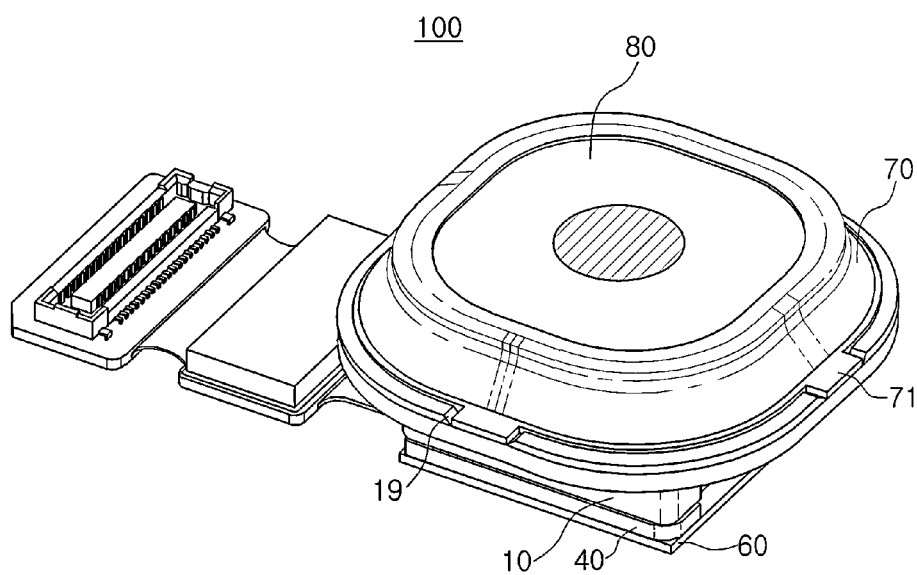
FIG. 1 is an assembled, perspective view of a camera module according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided to explain the principles of the invention and its practical applications, thereby enabling others skilled in the art to understand the invention for various embodiments and with various modifications as are suited to the particular use contemplated. In the drawings, the shapes and dimensions of elements may be exaggerated for clarity, and the same reference numerals will be used throughout to designate the same or like elements. It will also be understood that, although the terms first, second, etc. may be used herein to describe various elements, these elements should not be limited by these terms. These terms are only used to distinguish one element from another. As used in this description and the appended claims, the singular forms "a", "an" and "the" are intended to include the plural forms as well, unless the context clearly indicates otherwise.

Figure 2:
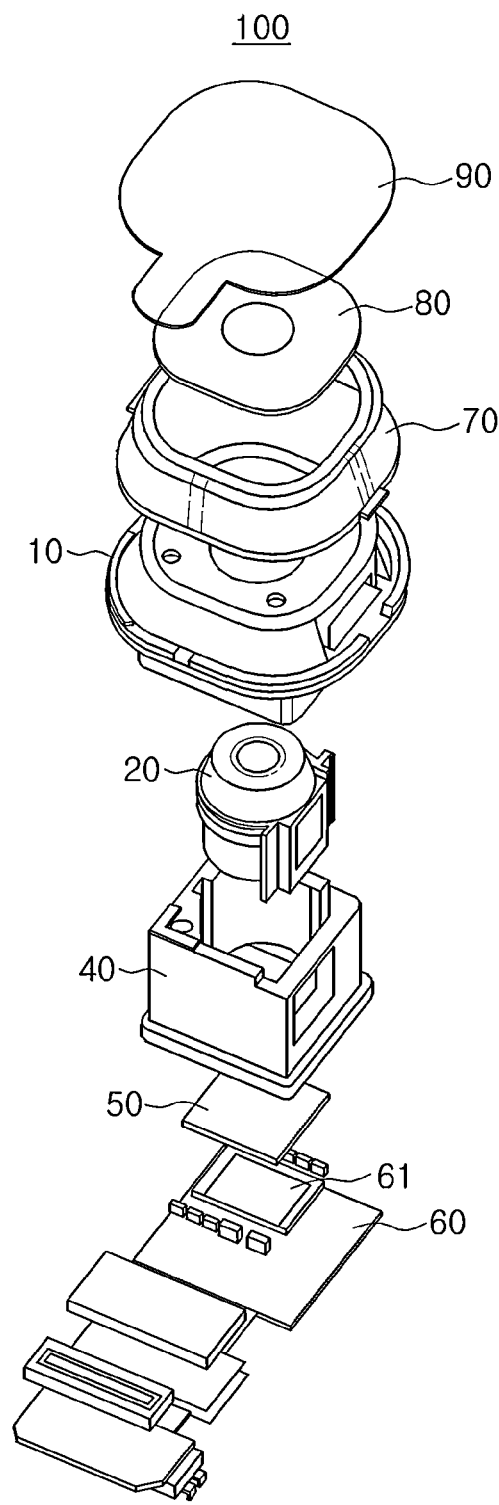
FIG. 2 is an exploded perspective view of the camera module according to the embodiment of the present invention.

FIG. 1 is an assembled, perspective view of a camera module according to an embodiment of the present invention. FIG. 2 is an exploded perspective view of the camera module according to the embodiment of the present invention.

Referring to FIGS. 1 and 2, a camera module 100 according to the embodiment of the present invention may include a case 10, a housing 40, a lens barrel 20, an infrared filter 50, an image sensor 61, a printed circuit board 60, a cover part 70, and a transparent window part or window glass part 80.

First, terms with respect to directions will be defined. An optical axis direction refers to a vertical direction based on the lens barrel 20, and a horizontal direction refers to a direction perpendicular to the optical axis direction.

The lens barrel 20 may have, for example, a hollow cylindrical shape such that at least one or more lenses for imaging an object may be received therein, and the lens may be provided in the lens barrel 20 in the optical axis direction.

The lens barrel 20 may be coupled to the housing 40. For instance, the lens barrel 20 may be disposed in the housing 40. Here, the lens barrel 20 may move in the optical axis direction in order to perform auto-focusing.

In order to move the lens barrel 20 in the optical axis direction, an actuator 30 including a voice coil motor (VCM) may be provided. The actuator 30 may include a coil 33, a magnet 31, a position sensor 35, and a yoke (not shown).

The magnet 31 may be mounted on one surface of the lens barrel 20, and the coil 33 may be mounted in the housing 40 to face the magnet 31.

The coil 33 may allow the lens barrel 20 to move in the optical axis direction by electromagnetic interaction between the coil 33 and the magnet 31 adjacent to each other.

The magnet 31 may form a predetermined magnetic field, such that when power is applied to the coil 33, a driving force caused by the electromagnetic force between the magnet 31 and the coil 33 may be generated, such that the lens barrel 20 may move in the optical axis direction by the driving force.

However, the element for moving the lens barrel 20 is not limited to the actuator 30 including the VCM. Various devices, such as a mechanical driving device, a piezoelectric driving device using a piezoelectric element, and the like, may be used.

The lens barrel 20 may move through the operation as described above to perform an auto-focusing function or a zoom function.

Meanwhile, the position sensor 35 may be provided in the center of the coil 33.

The position sensor 35 may sense a current position of the lens barrel 20 to provide current position information of the lens barrel 20 to a control part (not shown). The control part (not shown) may control movements of the lens barrel 20 by using the current position information of the lens barrel 20 received from the position sensor 35 and position information regarding a destination to which the lens barrel 20 needs to move.

By positioning the position sensor 35 in the center of the coil 33, the housing 40 may not be required to have a space for disposing the position sensor 35. From this, the actuator 30 may be miniaturized, and a manufacturing tolerance may be decreased during a manufacturing process.

The case 10 may be coupled to the housing 40 in order to enclose or cover outer surfaces of the housing 40.

Here, a conductive coating material (not shown) may be applied to at least one of the inner surfaces of the case 10 and the outer surfaces of the housing 40. An electromagnetic wave generated at the time of driving the camera module may be shielded by the conductive coating material (not shown).

That is, an electromagnetic wave may be generated at the time of driving the camera module. When the electromagnetic wave as described above is emitted to the exterior of the camera module, the electromagnetic wave may affect electronic components, thereby causing a communications error or malfunctioning.

Therefore, in order to block the electromagnetic wave from being emitted to the outside of the camera module, a conductive coating material (not shown) may be applied to at least one of the inner surfaces of the case 10 and the outer surfaces of the housing 40.

In addition, an electromagnetic wave generated by an external device on the image sensor 61 may be blocked, and various types of noise may also be blocked.

As to the conductive coating material (not shown), conductive epoxy may be used, but the present invention is not limited thereto. Various materials having conductivity may be used. Alternatively, a conductive film or conductive tape may be attached to at least one of the inner surfaces of the case 10 and the outer surfaces of the housing 40.

The case 10 and the housing 40 may be injection-molded. For instance, but not limited to, the case 10 and the housing 40 may be plastic injection-molded products.

The case 10 may include a protrusion part 11 protruding inwardly from an upper edge of the case 10 and a coupling forming part 13 protruding outwardly from the upper edge of the case 10.

A lower portion of the case 10 may have a rectangular parallelepiped shape. An upper portion of the case 10 may protrude outwardly in the horizontal direction further than the lower portion of the case.

Here, the upper portion of the case 10 provided with the coupling forming part 13 may have a cross-sectional area greater than that of the lower portion of the case 10, in the horizontal direction.

In addition, a cross-sectional area of the coupling forming part 13 in the horizontal direction may be decreased upwardly in the optical axis direction.

However, the shape of the case 10 is not limited to the above-mentioned shape, but may be variously changed according to shapes of the housing 40 and an external device in which the camera module is mounted.

A through-hole 11a may be formed in an upper surface of the case 10 such that external light may be incident therethrough. The external light incident through the through-hole 11a may be received in the image sensor 61 via the lens.

Here, the transparent window part or window glass part 80 may be mounted on the upper surface of the case 10 such that the window glass part 80 covers the through-hole 11a in order to protect the lens.

In order to stably mount the transparent window part or window glass part 80 on the upper surface of the case 10, the upper surface of the case 10 may be formed in a stepped manner.

That is, the upper surface of the case 10 may be provided with a step part 17 stepped downwardly in the optical axis direction, and the window glass part 80 may be mounted on the step part 17.

Protective tape 90 may be selectively attached to an upper surface of the transparent window part or window glass part 80.

In addition, the cover part 70 may be coupled to the coupling forming part 13 of the case 10 so as to cover an upper portion of the coupling forming part 13.

The coupling forming part 13 may have at least one insertion groove 19 formed in an outer edge of the upper portion thereof, and the cover part 70 may have at least one insertion protrusion 71 protruding from an outer edge thereof. The insertion protrusion 71 of the cover part 70 may be inserted into the insertion groove 19 of the coupling forming part 13, such that the cover part 70 may be coupled to the coupling forming part 13.

Further, the cover part 70 may be fixed to the coupling forming part 13 via an adhesive 75. By way of example and not limitation, a predetermined space may be formed between the cover part 70 and the coupling forming part 13, and may be filled with the adhesive 75, such that the cover part 70 and the coupling forming part 13 may be coupled to each other.

Since the upper portion of the case 10 may be sealed by the cover part 70 from the outside, the introduction of external foreign objects into the camera module 100 according to the embodiment of the present invention may be prevented.

The image sensor 61 such as a charge coupled device (CCD) or a complementary metal oxide semiconductor (CMOS) may be mounted on the printed circuit board 60 through wire bonding. The printed circuit board 60 may be coupled to a lower portion of the housing 40.

An image of the object may be collected on the image sensor 61 to be stored in a memory within a device as data, and the stored data may be displayed as an image through a display element provided in the device.

Here, the infrared filter 50 may be disposed between the lens barrel 20 and the image sensor 61. For instance, but not by limitation, the infrared filter 50 may be disposed below the lens barrel 20. Infrared rays in light which would pass through the lens may be blocked while having passed through the infrared filter 50, thereby preventing the infrared rays from being introduced to the image sensor 61.

Figure 3:
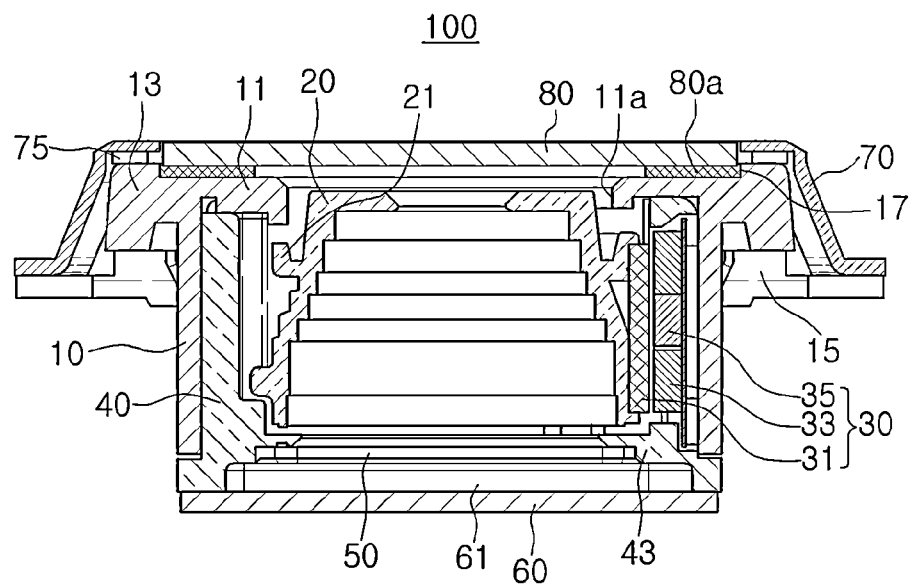
FIG. 3 is an assembled cross-sectional view of the camera module according to the embodiment of the present invention.
Figure 4:
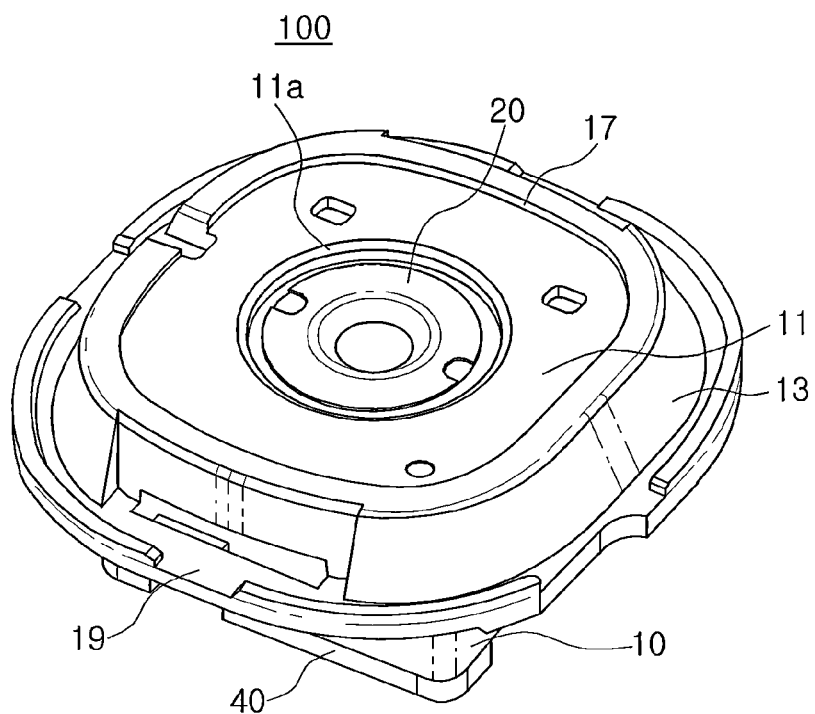
FIG. 4 is a perspective view of the camera module according to the embodiment of the present invention.
Figure 5:
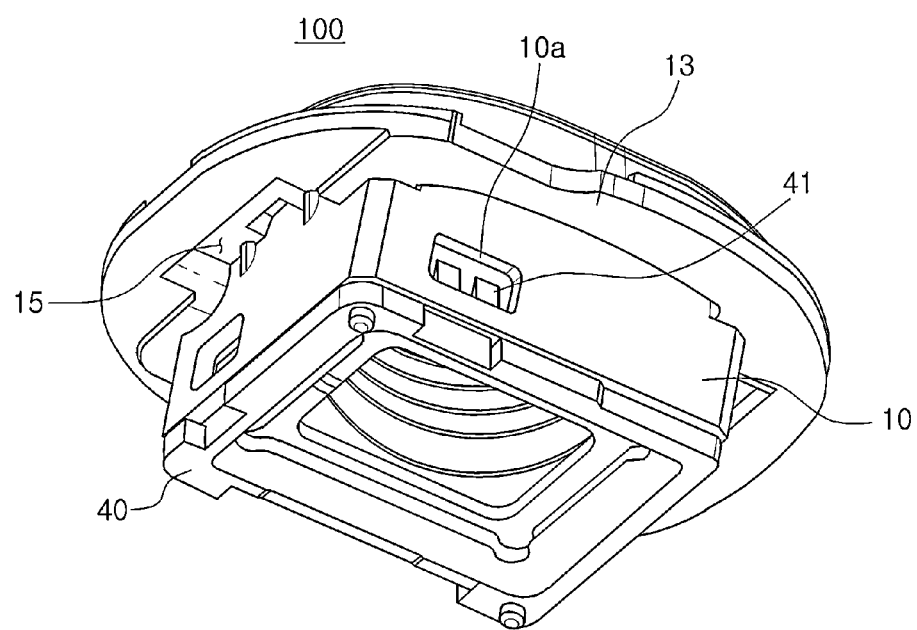
FIG. 5 is a bottom perspective view of the camera module according to the embodiment of the present invention.

FIG. 3 is an assembled cross-sectional view of the camera module according to the embodiment of the present invention, FIG. 4 is a perspective view of the camera module according to the embodiment of the present invention, and FIG. 5 is a bottom perspective view of the camera module according to the embodiment of the present invention.

Referring to FIGS. 3 through 5, as described above, the case 10 may be coupled to the housing 40 to enclose or cover the outer surfaces of the housing 40.

To this end, at least one coupling protrusion 41 may protrude from the outer surfaces of the housing 40, and at least one coupling hole 10a may be formed in the case 10 so as to be coupled to the coupling protrusion 41.

The coupling hole 10a may be formed in the case 10 such that the coupling hole 10a may penetrate through one surface of the case enclosing the outer surface of the housing 40.

Therefore, the coupling protrusion 41 may be inserted into the coupling hole 10a, such that the case 10 and the housing 40 may be coupled to each other.

The case 10 may include the protrusion part 11 protruding inwardly from the upper edge of the case 10.

The protrusion part 11 may be formed integrally with the case 10. That is, the protrusion part 11 may be formed integrally with the case 10 during an injection-molding process of the case 10.

The protrusion part 11 may serve as a stopper capable of limiting the moving distance of the lens barrel 20 in the optical axis direction.

The lens barrel 20 may include a catching part 21 protruding from an outer surface thereof in order to cause interference between the protrusion part 11 and the catching part 21 when the lens barrel 20 moves in the optical axis direction.

The catching part 21 may face the protrusion part 11, and when the lens barrel 20 moves in the optical axis direction, the catching part 21 may be caught by the protrusion part 11, such that the moving distance of the lens barrel 20 may be limited.

Since a lower surface of the protrusion part 11 may partially contact an upper surface of the housing 40, the protrusion part 11 may be supported by the housing 40.

In the camera module 100 according to the embodiment of the present invention, since the protrusion part 11 limiting the moving distance of the lens barrel 20 may be formed integrally with the case 10, a separate stopper member may not be required. Therefore, the number of components of the camera module may be decreased. The manufacturing process may be simplified, and manufacturing costs may be decreased.

The upper portion of the case 10 may protrude further outwardly in the horizontal direction than the lower portion of the case 10.

That is, the case 10 may further include the coupling forming part 13 protruding outwardly from the upper edge of the case 10.

The coupling forming part 13 may be formed integrally with the case 10, similar to the protrusion part 11.

The upper portion of the case 10, provided with the coupling forming part 13, may have a cross-sectional area greater in the horizontal direction than that of the lower portion of the case 10.

In addition, the cross-sectional area of the coupling forming part 13 in the horizontal direction may be decreased upwardly in the optical axis direction.

The coupling forming part 13 may be provided with a coupling part 15 in order to allow the camera module 100 according to the embodiment of the present invention to be mounted in an external device.

For instance, the coupling part 15 may have a shape of a groove recessed upwardly in the optical axis direction from a lower surface of the coupling forming part 13. However, the shape of the coupling part 15 is not limited thereto, but may have various shapes, for example, but not limited to, a hole penetrating through the coupling forming part 13.

The coupling part 15 may be formed integrally with the case 10. In the exemplary embodiment, the case 10 may be provided by injection-molding, and the coupling part 15 may be formed integrally with the case 10 during an injection-molding process.

That is, in order to mount the camera module 100 according to the embodiment of the present invention in an external device, since the coupling part 15, a coupling structure capable of being coupled to the external device, may be formed integrally with the case 10 during the manufacturing process of the case 10, a process for forming a separate coupling structure may not be required. This, for instance, simplifies the manufacturing process, and reduces the manufacturing costs.

In addition, since the coupling part 15 may be formed integrally with the case 10, the separation of the coupling part 15 from the case 10 due to external impacts, or the like, may be prevented. This enables the camera module to be securely mounted in the external device.

At least one coupling part 15 may be provided, or a plurality of coupling parts 15 may be provided to be spaced apart from each other by predetermined intervals.

The through-hole 11a may be formed in the upper surface of the case 10 such that external light may be incident therethrough, and the transparent window part or window glass part 80 may be mounted on the upper surface of the case 10 to cover the through hole 11a.

The upper surface of the case 10 may be provided with the step part 17 stepped downwardly in the optical axis direction in order to stably fix the transparent window part or window glass part 80. The transparent window part or window glass part 80 may be fixed to the step part 17 via an adhesive 80a.

Since the lens barrel 20 may be sealed by the transparent window part or window glass part 80 from the outside, the introduction of external foreign objects into the camera module 100 according to the embodiment of the present invention may be prevented.

In addition, since the window glass part 80 may be provided in the camera module itself, the alignment thereof with the lens in the lens barrel 20 may be adjusted at the time of assembling the camera module.

Further, a separate component for the fixation of the transparent window part or window glass part 80 may not be required, such that the camera module may be miniaturized.

That is, in the case of using a separate component for fixation of the transparent window part or window glass part 80, a separate space for the separated component may be required, such that the size of the camera module may be increased corresponding thereto.

However, in the camera module according to the embodiment of the present invention, since the transparent window part or window glass part 80 may be directly mounted on the case 10, the separate component for the fixation of the window glass part 80 is not required, such that the camera module may be miniaturized. Further, an external device having the camera module mounted therein may be miniaturized in accordance with the miniaturization of the camera module.

Furthermore, in the case in which a separate structure for the fixation of the transparent window part or window glass part 80 is required, an additional process for coupling the structure to the camera module is required. However, according to the embodiment of the present invention, since the transparent window part or window glass part 80 may be attached to the camera module itself, the manufacturing process may be simplified, and manufacturing costs may be reduced.

The case 10 of the camera module 100 according to the embodiment of the present invention may be manufactured by plastic molding.

Therefore, the shape of the case 10 described above may be easily implemented, and the coupling structure thereof may be easily implemented so as to be mounted in various external devices, such that a degree of design freedom may be improved.

Figure 6:
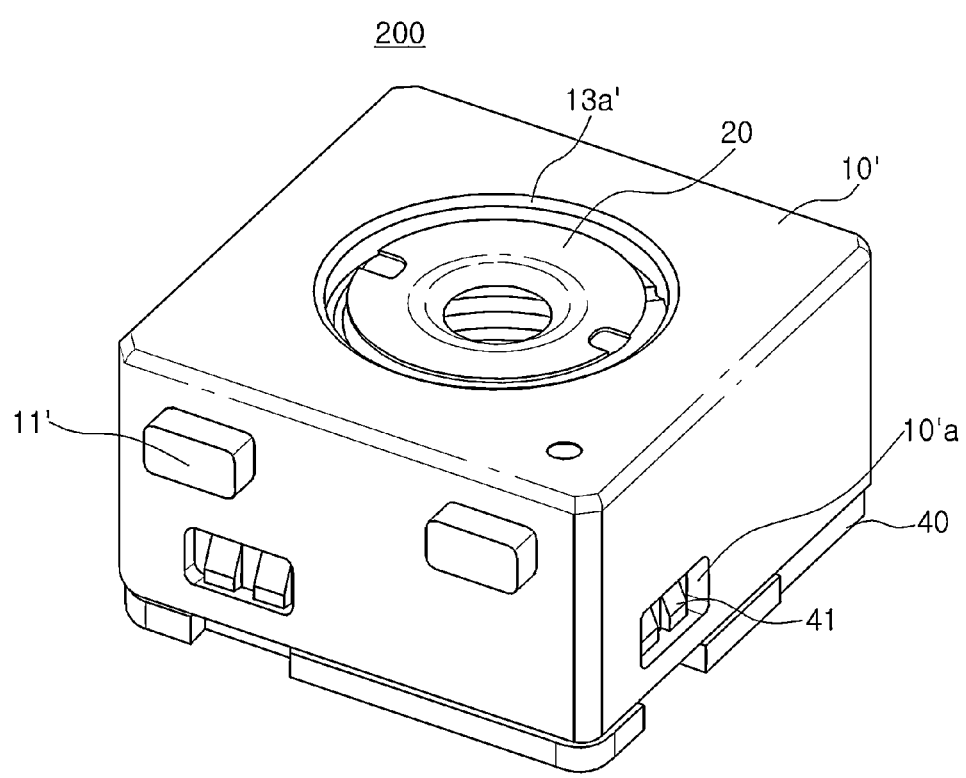
FIG. 6 is a perspective view of a camera module according to another embodiment of the present invention.
Figure 7:
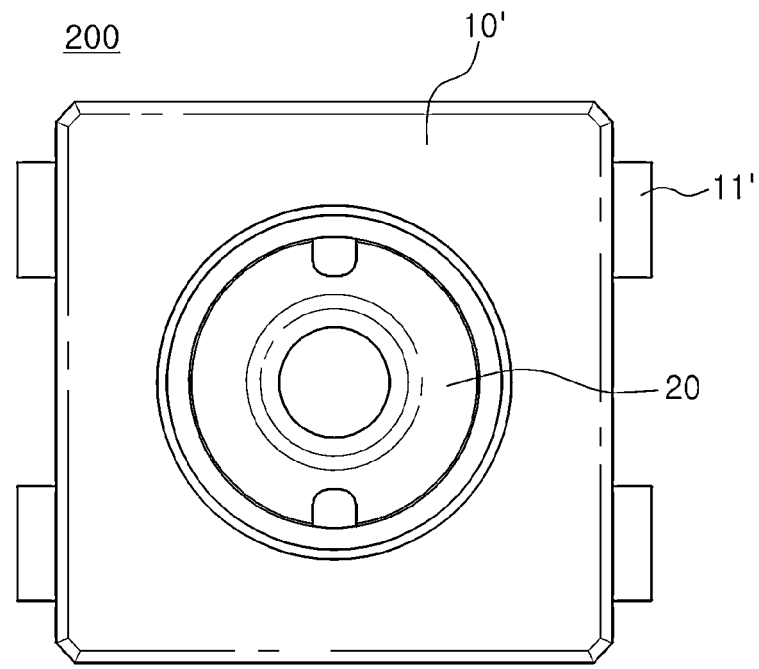
FIG. 7 is a plan view of the camera module according to another embodiment of the present invention.
Figure 8:
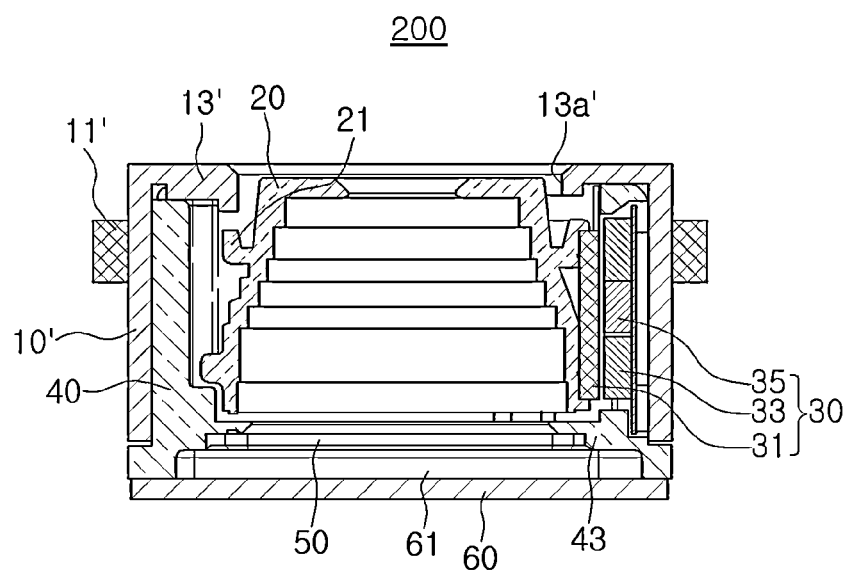
FIG. 8 is an assembled cross-sectional view of the camera module according to another embodiment of the present invention.

FIG. 6 is a perspective view of a camera module according to another embodiment of the present invention. FIG. 7 is a plan view of the camera module according to another embodiment of the present invention. FIG. 8 is an assembled cross-sectional view of the camera module according to another embodiment of the present invention.

Referring to FIGS. 6 through 8, since components of a camera module 200 according to another embodiment of the present invention may be the same as those of the camera module 100 according to the embodiment of the present invention, except for a case 10', descriptions thereof except for the case 10' will be omitted.

The case 10' may be coupled to the housing 40 to enclose or cover outer surfaces of the housing 40.

A through-hole 13a' may be formed in an upper surface of the case 10' such that external light may be incident therethrough, and the external light incident through the through-hole 13a' may be received in the image sensor 61 via the lens.

Here, a coupling part 11' for coupling with an external device may protrude from an outer surface of the case 10'. For example, the coupling part 11' may protrude from the outer surface of the case 10'. Alternatively, a plurality of coupling parts 11' may be formed on the outer surface of the case 10'.

In addition, an interior of the coupling part 11' may be solid without holes, and an inner surface of the case 10' corresponding to a portion thereof on which the coupling part 11' is formed may be a flat surface.

Here, the coupling part 11' may have a polyhedral shape. For example, the coupling part 11' may have a three-dimensional shape surrounded by polygonal sides and also have a three-dimensional shape except for a polyhedral shape, such as a cylindrical shape, or the like.

The coupling part 11' may be formed integrally with the case 10'. In the exemplary embodiment, the case 10' may be formed by injection-molding, and the coupling part 11' may be formed integrally with the case 10' during an injection-molding process.

Since the coupling part 11' may be formed integrally with the case 10' by injection-molding, the interior of the coupling part 11' may be solid without holes, and the inner surface of the case 10' corresponding to a portion thereof on which the coupling part 11' is formed may be a flat surface.

In the case of forming the coupling part 11' by a pressing process, or the like, the inner surface of the case 10' may not be flat, but the interior of the coupling part 11' may have a hollow shape.

Further, in the case of performing a firing process such as a pressing process, or the like, it may be difficult to form the coupling part 11' in a polyhedral shape. However, in the camera module 200 according to the embodiment of the present invention, since the case 10' and the coupling part 11' may be formed integrally with each other by injection-molding, the implementation of the above-mentioned shape may be facilitated.

In the case of forming the coupling part 11' by injection-molding, since a coupling structure thereof with an external device may be easily implemented in various manners and the coupling part 11' may have a polyhedral shape so as to have edges, the camera module may be securely coupled to the external device through the coupling part 11'.

Meanwhile, the case 10' may include a protrusion part 13' protruding inwardly from an upper edge of the case 10'.

The protrusion part 13' may be formed integrally with the case 10'. For instance, the protrusion part 13' may be formed integrally with the case 10' during an injection-molding process of the case 10'.

The protrusion part 13' may serve as a stopper capable of limiting the moving distance of the lens barrel 20 in the optical axis direction.

The lens barrel 20 may include the catching part 21 protruding from the outer surface thereof in order to cause interference between the protrusion part 13' and the catching part 21 when the lens barrel 20 moves in the optical axis direction.

The catching part 21 may face the protrusion part 13'. When the lens barrel 20 moves in the optical axis direction, the catching part 21 may be caught by the protrusion part 13' such that the moving distance of the lens barrel 20 may be limited.

Since a lower surface of the protrusion part 13' may partially contact the upper surface of the housing 40, the protrusion part 13' may be supported by the housing 40.

The protrusion part 13' limiting the moving distance of the lens barrel 20 may be formed integrally with the case 10, such that a separate stopper member may not be required. Therefore, the number of components of the camera module may be decreased, the manufacturing process may be simplified, and manufacturing costs may be reduced.

Further, in the camera module 200 according to another embodiment of the present invention, the coupling part 11', a coupling structure capable of being coupled to an external device, may be formed integrally with the case 10' during the manufacturing process of the case 10'. Therefore, process for forming a separate coupling structure may not be required such that the manufacturing process may be simplified and manufacturing costs may be reduced. In addition, the securing of an assembly tolerance may be facilitated during an assembling process.

A shape of the coupling part 11' and the number thereof may be variously changed according to the shape of an external device in which the camera module 200 according to another embodiment of the present invention is mounted.

Since the case 10' may be provided by plastic molding, and the coupling structure thereof may be easily implemented such that the camera module may be coupled to various external devices, the degree of design freedom is improved.

As set forth above, in the camera module according to the embodiment of the present invention, a stopper member limiting the moving distance of the lens barrel, that is, the protrusion part, may be formed integrally with the case. Therefore, the manufacturing process may be simplified and manufacturing costs may be reduced while the miniaturization and slimness of the camera module may be implemented.

In addition, the case of the camera module may be provided with a coupling structure formed in various manners in order to couple the camera module to an external device. With this, the camera module and the external device may be easily coupled to each other.

Additionally, the coupling structure may be formed integrally with the case, such that the coupling structure may be easily implemented, the manufacturing process may be simplified, and manufacturing costs may be reduced.

Further, the transparent window part or window glass part may be attached to the case of the camera module, such that a separate component for the attachment of the transparent window part or window glass part may not be required. The transparent window part or the window glass part may be attached to the camera module itself, thereby allowing for the miniaturization and slimness of the camera module.

While the present invention has been shown and described in connection with the embodiments, it will be apparent to those skilled in the art that modifications and variations can be made without departing from the spirit and scope of the invention as defined by the appended claims. Accordingly, the illustrative discussions above are not intended to be exhaustive or to limit the invention to the precise forms disclosed.

What is claimed is:

1. A camera module comprising:
   a lens barrel;
   a housing having the lens barrel disposed therein;
   an actuator configured to move the lens barrel to perform an automatic focus; and
   a case coupled to the housing to cover outer surfaces of the housing,
   wherein the case includes a protrusion part protruding inwardly from an upper edge of the case and formed integrally with the case.

2. The camera module of claim 1, wherein a lower surface of the protrusion part contacts an upper surface of the housing.

3. The camera module of claim 1, wherein the lens barrel includes a catching part protruding from an outer surface thereof and facing the protrusion part.

4. The camera module of claim 1, wherein:
   the lens barrel comprises one or more lenses in an optical axis direction, and
   the protrusion part of the case is configured to limit movement of the lens barrel in the optical axis direction.

5. The camera module of claim 1, wherein the case further comprises a coupling forming part protruding outwardly from the upper edge of the case.

6. The camera module of claim 5, wherein an upper portion of the case provided with the coupling forming part has a cross-sectional area greater in a horizontal direction than that of a lower portion of the case.

7. The camera module of claim 5, wherein a cross-sectional area of the coupling forming part in a horizontal direction decreases upwardly in an optical axis direction.

8. The camera module of claim 5, wherein the coupling forming part comprises a coupling part for coupling with an external device.

9. The camera module of claim 8, wherein the coupling part defines a groove recessed upwardly in an optical axis direction from a lower surface of the coupling forming part.

10. The camera module of claim 8, wherein the coupling part defines a hole penetrating through the coupling forming part.

11. The camera module of claim 5, further comprising: a cover part coupled to the case to cover an upper portion of the coupling forming part.

12. The camera module of claim 11, wherein the cover part is coupled to the coupling forming part via an adhesive.

13. The camera module of claim 11, wherein the coupling forming part defines an insertion groove formed in an outer edge of the upper portion thereof, and the cover part has an insertion protrusion protruding from an outer edge thereof, the insertion protrusion being inserted into the insertion groove.

14. The camera module of claim 5, wherein the coupling forming part is formed integrally with the case.

15. The camera module of claim 1, further comprising: a transparent window part coupled to an upper surface of the case.

16. The camera module of claim 15, wherein the transparent window part is coupled to the case via an adhesive.

17. The camera module of claim 15, wherein the upper surface of the case is provided with a step part stepped downwardly in the optical axis direction, the transparent window part being mounted on the step part.

18. A camera module comprising:
a lens barrel;
a housing having the lens barrel disposed therein; and
a case coupled to the housing to cover outer surfaces of the housing,
wherein
the case is provided with a coupling part for coupling with an external device, the coupling part protruding from an outer surface of the case, and
an inner surface of the case corresponding to a portion thereof on which the coupling part is formed is a flat surface.

19. The camera module of claim 18, wherein the coupling part is formed integrally with the case.

20. The camera module of claim 18, wherein the coupling part has a polyhedral shape.

21. The camera module of claim 18, wherein the case includes a protrusion part protruding inwardly from an upper edge of the case.

22. The camera module of claim 21, wherein the lens barrel includes a catching part protruding from an outer surface thereof and facing the protrusion part.

23. A camera module, comprising:
a lens barrel;
a housing receiving the lens barrel therein;
an actuator configured to move the lens barrel to perform an automatic focus; and
a case covering the housing, the case having a first part protruding inwardly from an upper edge of the case,
wherein the first part is formed integrally as one piece with the case.

24. The camera module of claim 23, wherein the first part of the case is configured to limit movement of the lens barrel in an optical axis direction.

25. The camera module of claim 23, wherein the case further comprises a second part protruding outwardly from the upper edge of the case, and the second part of the case is formed integrally as one piece with the case.

26. The camera module of claim 25, wherein the second part of the case defines a groove or a hole.

27. The camera module of claim 25, wherein the case further comprises a cover part covering an upper portion of the second part of the case.

28. The camera module of claim 27, wherein the cover part is coupled to the second part of the case via an adhesive.

29. The camera module of claim 25, wherein the second part of the case is configured to couple with an external device.

30. The camera module of claim 23, further comprising a transparent window part coupled to the case.

31. The camera module of claim 30, wherein the upper surface of the case comprises a step part to mount the transparent window part thereon.

32. The camera module of claim 23, wherein the lens barrel comprises a catching part protruding from an outer surface thereof and facing the protrusion part.

33. The camera module of claim 23, wherein a lower surface of the first part contacts an upper surface of the housing.

34. A camera module, comprising:
a lens barrel;
an actuator configured to move the lens barrel to perform an automatic focus;
a housing receiving the lens barrel therein;
a case covering the housing and having a first part protruding inwardly from an upper edge of the case, the first part formed integrally as one piece with the case; and
a transparent window part integrally mounted on the case.

35. The camera module of claim 34, wherein the case further comprises a second part protrude outwardly from the upper edge of the case, and the second part of the case is formed integrally as one piece with the case.

36. The camera module of claim 35, wherein the second part of the case is configured to couple with an external device.

37. The camera module of claim 35, wherein the case further comprises a cover part covering an upper portion of the second part of the case.

38. The camera module of claim 34, wherein a lower surface of the first part of the case contacts an upper surface of the housing.

39. The camera module of claim 34, wherein:
the lens barrel comprises one or more lenses in an optical axis direction, and
the first part of the case is configured to limit movement of the lens barrel in the optical axis direction.

40. The camera module of claim 34, wherein the lens barrel comprises a catching part protruding from an outer surface thereof and facing the first part of the case.

* * * * *